United States Patent
Sawai et al.

(10) Patent No.: US 7,696,835 B2
(45) Date of Patent: Apr. 13, 2010

(54) COMMUNICATION SYSTEM, TRANSMITTING DEVICE, TRANSMITTING METHOD, RECEIVING DEVICE, AND RECEIVING METHOD

(75) Inventors: Jun Sawai, Kanagawa (JP); Yujiro Ito, Kanagawa (JP); Nobuyuki Ishikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 281 days.

(21) Appl. No.: 11/500,849

(22) Filed: Aug. 8, 2006

(65) Prior Publication Data

US 2007/0037516 A1 Feb. 15, 2007

(30) Foreign Application Priority Data

Aug. 10, 2005 (JP) ............................ P2005-231637

(51) Int. Cl.
*H01P 5/04* (2006.01)
*H04B 1/00* (2006.01)
(52) U.S. Cl. ............................ 333/20; 333/24 R; 333/4
(58) Field of Classification Search ............... 333/24 R, 333/4, 5, 25, 17.1, 20
See application file for complete search history.

(56) References Cited

U.S. PATENT DOCUMENTS 4,494,241 A * 1/1985 Mayoux ...................... 375/317

| | | | |
|---|---|---|---|
| 6,614,848 B2* | 9/2003 | Lohr | 375/257 |
| 2002/0057137 A1* | 5/2002 | Marketkar et al. | 333/24 R |
| 2005/0040909 A1* | 2/2005 | Waight et al. | 333/17.1 |
| 2005/0040910 A1* | 2/2005 | Rijks | 333/25 |

FOREIGN PATENT DOCUMENTS

| JP | 7 297625 | 11/1995 |
|---|---|---|
| JP | 08-224233 | 9/1996 |
| JP | 11-261330 | 9/1999 |
| JP | 2003-244014 | 8/2003 |
| JP | 2004-289777 | 10/2004 |
| JP | 2004-348636 | 12/2004 |

* cited by examiner

*Primary Examiner*—Benny Lee
*Assistant Examiner*—Gerald Stevens
(74) *Attorney, Agent, or Firm*—Frommer Lawrence & Haug LLP; William S. Frommer; Ellen Marcie Emas

(57) ABSTRACT

A communication system includes a transmitting device configured to transmit data and a receiving device configured to receive the data. The transmitting device includes first and second transmission lines and a differential signal outputter configured to generate differential signals from the microwave signal corresponding to the data, and to output one of the differential signals to the first transmission line and the other differential signal to the second transmission line. The receiving device includes third and fourth transmission lines and a converter. The differential signals are transmitted to the third and fourth transmission lines from the first and second transmission lines via line-to-line couplings. The converter then converts the differential signals into the microwave signal corresponding to the data, and outputs the converted microwave signal.

6 Claims, 10 Drawing Sheets

COMMUNICATION SYSTEM, TRANSMITTING DEVICE, TRANSMITTING METHOD, RECEIVING DEVICE, AND RECEIVING METHOD

CROSS REFERENCES TO RELATED APPLICATIONS

The present invention contains subject matter related to Japanese Patent Application JP 2005-231637 filed in the Japanese Patent Office on Aug. 10, 2005, the entire contents of which are incorporated herein by reference.

BACKGROUND OF THE INVENTION

1. Field of the Invention

The present invention relates to communication systems, transmitting devices, transmitting methods, receiving devices, and receiving methods. More particularly, the present invention relates to a communication system, a transmitting device, a transmitting method, a receiving device, and a receiving method enabling suppression of radiated power generated by communication via a line-to-line coupling.

2. Description of the Related Art

Types of communication system for transmitting and receiving data include a contact type and a contactless type. The contact communication systems exchange data via electric contact points such as connectors. In contrast, the contactless communication systems do not require such electronic contact points.

Adhesion of extraneous materials, such as dust, moisture, and oil, to electric contact points or formation of oxide film on the electric contact points may make contact communication systems unable to transmit and receive signals correctly. In addition, static electricity may destroy internal circuits, when electric contact points are exposed. In order to prevent such circumstances, highly-accurate processing is performed to form the shapes of the electric contact points.

On the other hand, contactless communication systems are free from the above-described problems since contactless communication systems require no electric contact points.

In contactless communication methods, communication is performed via, for example, electromagnetic fields, capacitances, microwaves, or laser beams. A transfer rate higher than a few hundred Mbps (megabits per second), particularly that exceeding 1 Gbps, is achieved only in communication via laser beams or microwaves.

However, devices used for communication via laser beams are still expensive. Miniaturization of such devices is also difficult. In addition, in communication via microwaves, radiated power has to be controlled so as not to exceed a value determined by the Radio Law of each country.

One of the contactless communication methods that implement communication at a high transfer rate employs a line-to-line coupling generated by bringing microstrip lines closer so that they face each other (hereinafter, referred to as "line-to-line coupling of the microstrip lines").

In communication via the line-to-line coupling of microstrip lines, radiated power is much smaller than that generated when a radio wave (e.g., microwave) is radiated using an antenna (i.e., a microstrip antenna) as suggested in Japanese Unexamined Patent Application Publication No. 07-297625. However, it may be difficult to control the radiated power so as not to exceed values determined by laws without taking any measures. When communication is performed at a high transfer rate, the radio wave (i.e., electromagnetic wave) radiated by the line-to-line coupling of the microstrip lines has a frequency band between 322 MHz and 10 GHz. In Japan, the radiated power in this frequency band has to be controlled so as not to exceed 35 µV.

SUMMARY OF THE INVENTION

In view of the above-described circumstances, embodiments of the present invention enable suppression of radiated power in communication via a line-to-line coupling.

According to an embodiment of the present invention, a communication system includes a transmitting device configured to transmit data and a receiving device configured to receive the data. The transmitting device includes first and second transmission lines and a differential signal outputter. The first and second transmission lines, disposed in parallel at a predetermined gap, are configured to propagate a microwave signal. The differential signal outputter is configured to generate differential signals from the microwave signal corresponding to the data, and to output one of the differential signals to the first transmission line and the other differential signal to the second transmission line. The receiving device includes third and fourth transmission lines and a converter. The third and fourth transmission lines, disposed in parallel at the predetermined gap, are configured to propagate the microwave signal. The converter is configured to convert the differential signals generated at the third and fourth transmission lines by line-to-line couplings into the microwave signal corresponding to the data, and to output the converted microwave signal. The differential signals are generated at the third and fourth transmission lines by the line-to-line couplings when the third and fourth transmission lines are brought closer to the first and second transmission lines that are propagating the differential signals so that the first and second transmission lines face the third and fourth transmission lines, respectively.

In the above-described embodiment of the present invention, the communication system includes the transmitting device configured to transmit the data and the receiving device configured to receive the data. The transmitting device generates the differential signals from the microwave signal corresponding to the data to be transmitted to the receiving device, and outputs one of the differential signals to the first transmission line and the other differential signal to the second transmission line. The differential signals are transmitted to the third and fourth transmission lines of the receiving device via the line-to-line couplings generated between the first and second transmission lines and the third and fourth transmission lines, respectively. The line-to-line couplings are generated when the third and fourth transmission lines are brought closer to the first and second transmission lines that are propagating the differential signals, facing each other, respectively. The differential signals are then converted into the microwave signal corresponding to the data, and the converted microwave signal is output.

According to another embodiment of the present invention, a transmitting device, configured to transmit data to a receiving device having first and second transmission lines, includes third and fourth transmission lines and a differential signal outputter. The third and fourth transmission lines, disposed in parallel at a predetermined gap, are configured to propagate a microwave signal. The differential signal outputter is configured to generate differential signals from the microwave signal corresponding to the data, and to output one of the differential signals to the third transmission line and the other differential signal to the fourth transmission line. The data is transmitted to the receiving device via line-to-line couplings generated between the third transmission line and the first transmission line of the receiving device and between the fourth transmission line and the second transmission line of the receiving device when the first and second transmission lines are brought closer to the third and fourth transmission lines that are propagating the differential signals so that the first and second transmission lines face the third and fourth transmission lines, respectively.

The third and fourth transmission lines may be microstrip lines.

The differential signal outputter may be a coil.

According to still another embodiment of the present invention, a transmitting method for a transmitting device including first and second transmission lines, disposed in parallel at a predetermined gap, configured to propagate a microwave signal, and a differential signal outputter configured to generate differential signals from the microwave signal corresponding to data to be transmitted to a receiving device that includes third and fourth transmission lines, and to output one of the differential signals to the first transmission line and the other differential signal to the second transmission line, the method includes the steps of causing the differential signal outputter to generate the differential signals from the microwave signal corresponding to the data, and to output one of the differential signals to the first transmission line and the other differential signal to the second transmission line, and causing the first transmission line to propagate one of the differential signals generated from the microwave signal corresponding to the data and the second transmission line to propagate the other differential signal. The data is transmitted to the receiving device via line-to-line couplings generated between the first transmission line and the third transmission line of the receiving device and between the second transmission line and the fourth transmission line of the receiving device when the third and fourth transmission lines are brought closer to the first and second transmission lines that are propagating the differential signals so that the third and fourth transmission lines face the first and second transmission lines, respectively.

In the above-described embodiment of the present invention, the differential signals are generated from the microwave signal corresponding to the data to be transmitted to the receiving device. One of the differential signals is output to the first transmission line and the other differential signal is output to the second transmission line. The data is transmitted to the receiving device via the line-to-line couplings generated between the first and second transmission lines that are propagating the differential signals and the third and fourth transmission lines of the receiving device brought closer to the first and second transmission lines so as to face each other, respectively.

According to a further embodiment of the present invention, a receiving device, configured to receive data from a transmitting device having first and second transmission lines, includes third and fourth transmission lines and a converter. The third and fourth transmission lines, disposed in parallel at a predetermined gap, are configured to propagate a microwave signal. The converter is configured to convert differential signals generated at the third and fourth transmission lines by line-to-line couplings into the microwave signal corresponding to the data, and to output the converted microwave signal. The differential signals are generated at the third and fourth transmission lines by the line-to-line couplings when the third and fourth transmission lines are brought closer to the first and second transmission lines that are propagating the differential signals generated from the microwave signal corresponding to the data so that the third and fourth transmission lines face the first and second transmission lines, respectively.

The third and fourth transmission lines may be microstrip lines.

The receiving apparatus may further include a level detector configured to detect the level of the signal output from the converter. The converter adjusts the level of the signal corresponding to the data in accordance with the level detected by the level detector, and outputs the signal.

According to a still further embodiment of the present invention, a receiving method for a receiving device, configured to receive data from a transmitting device having first and second transmission lines, including third and fourth transmission lines, disposed in parallel at a predetermined gap, configured to propagate a microwave signal, and a converter configured to convert differential signals generated at the third and fourth transmission lines by line-to-line couplings into the microwave signal corresponding to the data, and to output the converted microwave signal, wherein the differential signals are generated at the third and fourth transmission lines when the third and fourth transmission lines are brought closer to the first and second transmission lines that are propagating the differential signals generated from the microwave signal corresponding to the data so that the third and fourth transmission lines face the first and second transmission lines, respectively, the method includes the steps of causing the third transmission line to propagate one of the differential signals and the fourth transmission line to propagate the other differential signal, and causing the converter to convert the differential signals into the microwave signal corresponding to the data, and to output the converted microwave signal.

In the above-described embodiment, the differential signals, generated from the microwave signal corresponding to data transmitted from the transmitting device having the first and second transmission lines, propagate along the third and fourth transmission lines. The differential signals are converted into the microwave signal corresponding to the data, and the converted microwave signal is output.

Embodiments of the present invention can implement communication via a line-to-line coupling. In addition, the embodiment of the present invention can suppress radiated power.

DESCRIPTION OF THE PREFERRED EMBODIMENTS

Figure 1:
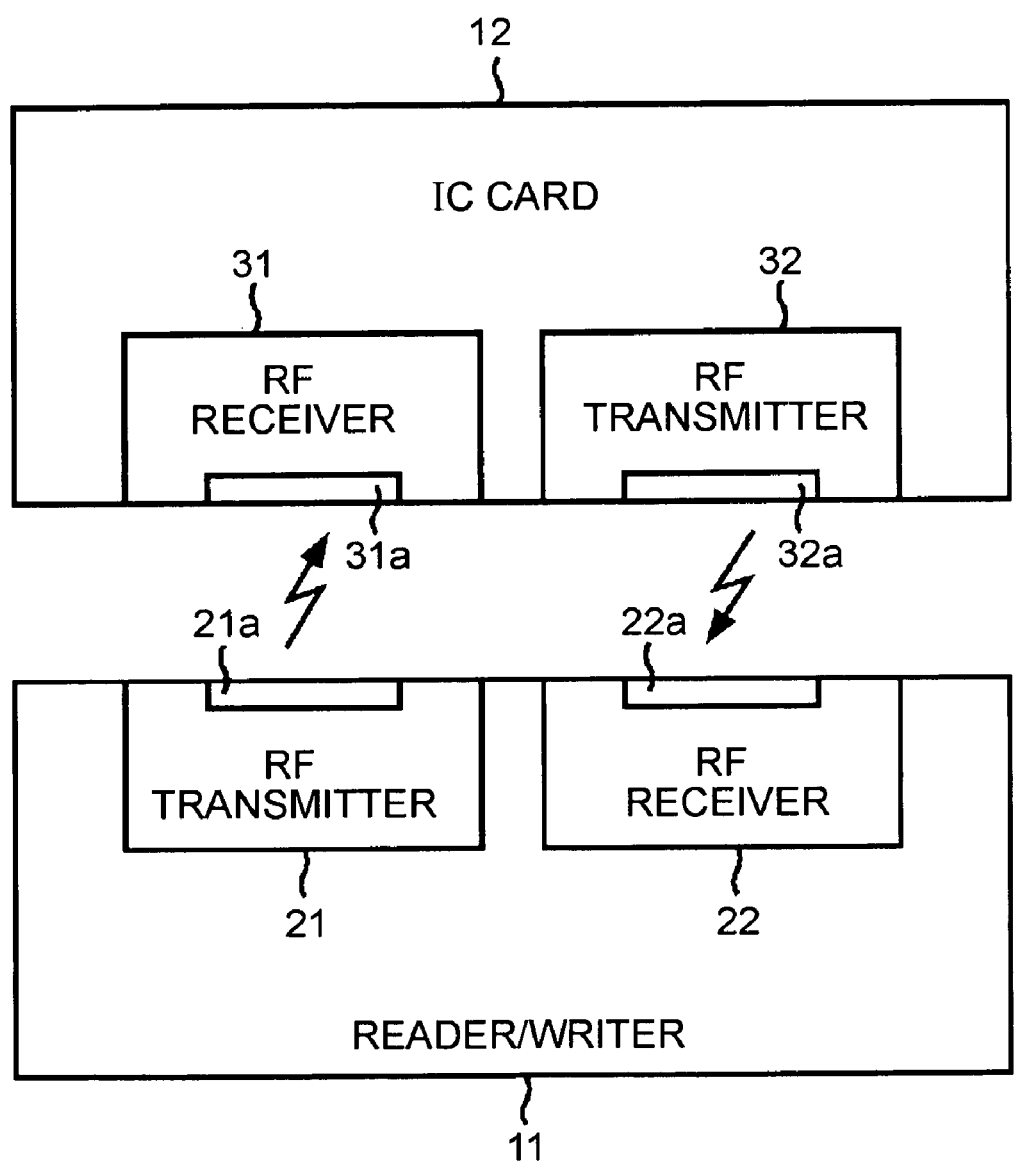
FIG. 1 is a block diagram illustrating an example of a configuration of a communication system according to an embodiment of the present invention.

Before describing embodiments of the present invention, the correspondence between the features of the present invention and the specific elements disclosed in embodiments of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

According to an embodiment of the present invention, a communication system includes a transmitting device (for example, an RF transmitter 21 shown in FIG. 1), configured to transmit data, including first and second transmission lines, disposed in parallel at a predetermined gap, configured to propagate a microwave signal, and a differential signal outputter (for example, a differential driver 152 shown in FIG. 5) configured to generate differential signals from the microwave signal corresponding to the data, and to output one of the differential signals to the first transmission line and the other differential signal to the second transmission line, and a receiving device (for example, an RF receiver 31 shown in FIG. 1), configured to receive the data, including third and fourth transmission lines (for example, conductive strips 121A and 121B shown in FIG. 3), disposed in parallel at the predetermined gap, configured to propagate the microwave signal, and a converter (for example, an LNA 172 shown in FIG. 6) configured to convert the differential signals generated at the third and fourth transmission lines by line-to-line couplings into the microwave signal corresponding to the data, and to output the converted microwave signal, wherein the differential signals are generated at the third and fourth transmission lines by the line-to-line couplings when the third and fourth transmission lines are brought closer to the first and second transmission lines that are propagating the differential signals so that the third and fourth transmission lines face the first and second transmission lines, respectively.

According to another embodiment of the present invention, a transmitting device (for example, an RF transmitter 21 shown in FIG. 1), configured to transmit data to a receiving device having first and second transmission lines, includes third and fourth transmission lines (for example, conductive strips 101A and 101B shown in FIG. 3), disposed in parallel at a predetermined gap, configured to propagate a microwave signal, and a differential signal outputter (for example, a differential driver 152 shown in FIG. 5) configured to generate differential signals from the microwave signal corresponding to the data, and to output one of the differential signals to the third transmission line and the other differential signal to the fourth transmission line, wherein the data is transmitted to the receiving device via line-to-line couplings generated between the third transmission line and the first transmission line of the receiving device and between the fourth transmission line and the second transmission line of the receiving device when the first and second transmission lines are brought closer to the third and fourth transmission lines that are propagating the differential signals so that the first and second transmission lines face the third and fourth transmission lines, respectively.

According to still another embodiment of the present invention, a transmitting method for a transmitting device including first and second transmission lines, disposed in parallel at a predetermined gap, configured to propagate a microwave signal, and a differential signal outputter configured to generate differential signals from the microwave signal corresponding to data to be transmitted to a receiving device that includes third and fourth transmission lines, and to output one of the differential signals to the first transmission line and the other differential signal to the second transmission line, the method includes the steps of causing the differential signal outputter to generate the differential signals from the microwave signal corresponding to the data, and to output one of the differential signals to the first transmission line and the other differential signal to the second transmission line (for example, STEP S14 shown in FIG. 8), and causing the first transmission line to propagate one of the differential signals generated from the microwave signal corresponding to the data and the second transmission line to propagate the other differential signal (for example, STEP S15 shown in FIG. 8), wherein the data is transmitted to the receiving device via line-to-line couplings generated between the first transmission line and the third transmission line of the receiving device and between the second transmission line and the fourth transmission line of the receiving device when the third and fourth transmission lines are brought closer to the first and second transmission lines that are propagating the differential signals so that the third and fourth transmission lines face the first and second transmission lines, respectively.

According to a further embodiment of the present invention, a receiving device (for example, an RF receiver 31 shown in FIG. 1), configured to receive data from a transmitting device having first and second transmission lines, includes third and fourth transmission lines (for example, conductive strips 121A and 121B shown in FIG. 3), disposed in parallel at a predetermined gap, configured to propagate a microwave signal, and a converter (for example, an LNA 172 shown in FIG. 6) configured to convert differential signals generated at the third and fourth transmission lines by line-to-line couplings into the microwave signal corresponding to the data, and to output the converted microwave signal, wherein the differential signals are generated at the third and fourth transmission lines by the line-to-line couplings when the third and fourth transmission lines are brought closer to the first and second transmission lines that are propagating the differential signals generated from the microwave signal corresponding to the data so that the third and fourth transmission lines face the first and second transmission lines, respectively.

This receiving device may further include a level detector (for example, a level detecting circuit 303 shown in FIG. 6) configured to detect the level of the signal output from the converter, wherein the converter adjusts the level of the signal corresponding to the data in accordance with the level detected by the level detector, and outputs the signal.

Figure 8:
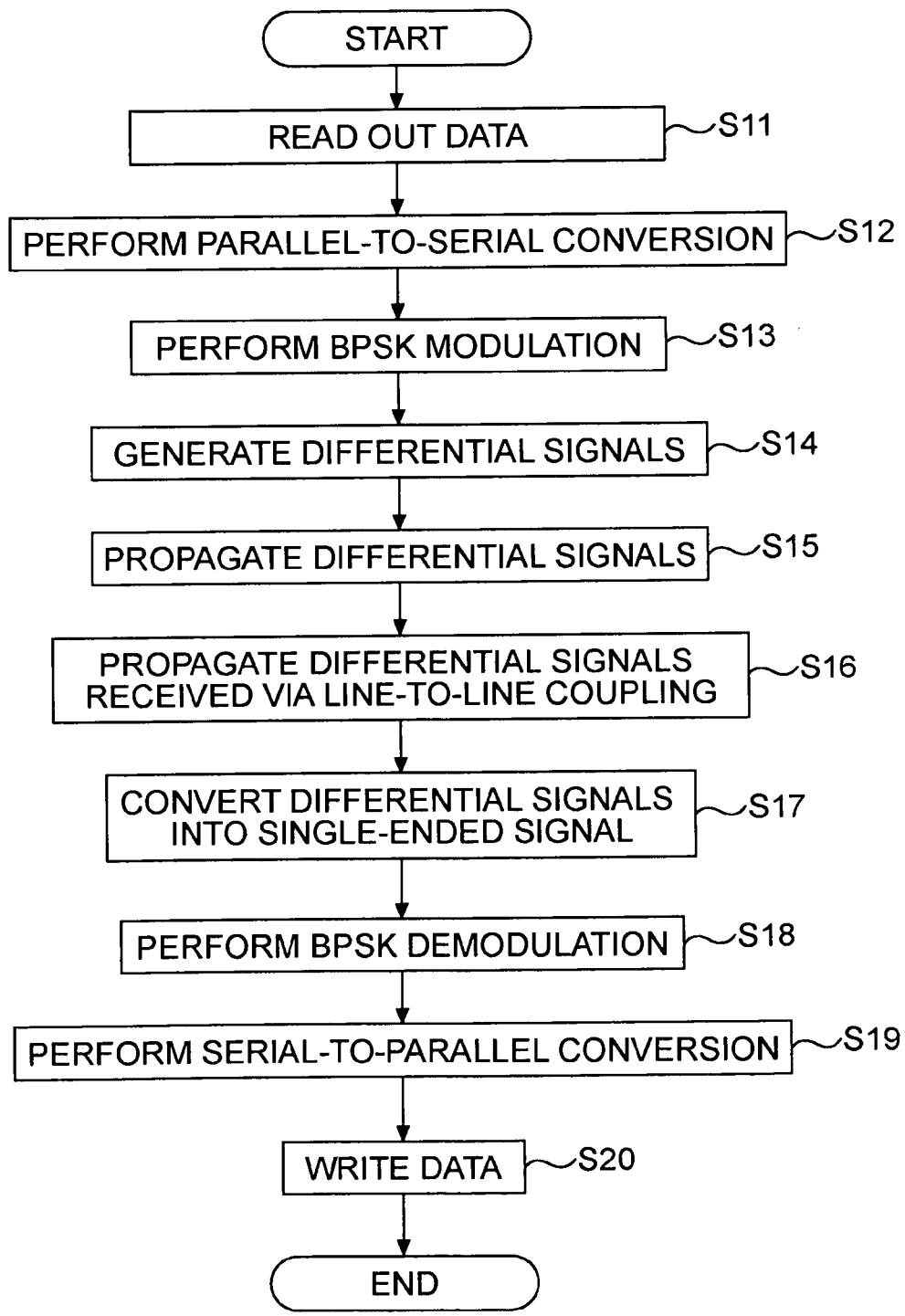
FIG. 8 is a flowchart illustrating a data transmission/reception operation.

According to a still further embodiment of the present invention, a receiving method for a receiving device, configured to receive data from a transmitting device having first and second transmission lines, including third and fourth transmission lines, disposed in parallel at a predetermined gap, configured to propagate a microwave signal, and a converter configured to convert differential signals generated at the third and fourth transmission lines by line-to-line couplings into the microwave signal corresponding to the data, and to output the converted microwave signal, wherein the differential signals are generated at the third and fourth transmission lines when the third and fourth transmission lines are brought closer to the first and second transmission lines that are propagating the differential signals generated from the microwave signal corresponding to the data so that the third and fourth transmission lines face the first and second transmission lines, respectively, the method includes the steps of causing the third transmission line to propagate one of the differential signals and the fourth transmission line to propagate the other differential signal (for example, STEP S16 shown in FIG. 8), and causing the converter to convert the differential signals into the microwave signal corresponding to the data, and to output the converted microwave signal (for example, STEP S17 shown in FIG. 8).

Embodiments of the present invention will be described in detail below with reference to the accompanying drawings.

FIG. 1 illustrates an example of a configuration of a communication system according to an embodiment of the present invention.

Referring to FIG. 1, the communication system includes a reader/writer 11 and an IC (Integrated Circuit) card 12.

The reader/writer 11 and the IC card 12 contactlessly transmit and receive data.

More specifically, the reader/writer 11 includes an RF (Radio Frequency) transmitter 21 and an RF receiver 22. The IC card 12 includes an RF receiver 31 and an RF transmitter 32. The RF transmitter 21 transmits RF signals corresponding to data to the RF receiver 31 of the IC card 12. The RF receiver 22 receives RF signals transmitted from the RF transmitter 32 of the IC card 12, and stores data converted from the RF signals.

Likewise, the RF receiver 31 of the IC card 12 receives RF signals transmitted from the RF transmitter 21 of the reader/writer 11, and stores data converted from the RF signals. The RF transmitter 32 transmits RF signals corresponding to data to the RF receiver 22 of the reader/writer 11.

The RF transmitter 21 of the reader/writer 11 and the RF receiver 31 of the IC card 12 have a communication surface 21a and a communication surface 31a, respectively. Each of the communication surfaces 21a and 31a includes a microstrip line. More specifically, conductive strips are disposed on each of the communication surfaces 21a and 31a. When the communication surfaces 21a and 31a, facing each other, are brought closer to each other, line-to-line couplings are achieved between the conductive strips disposed on the communication surface 21a and those on the communication surface 31a (i.e., line-to-line coupling of the microstrip lines). The RF transmitter 21 and the RF receiver 31 perform data transmission/reception operations via the line-to-line coupling of microstrip lines. Likewise, a communication surface 22a of the RF receiver 22 of the reader/writer 11 and a communication surface 32a of the RF transmitter 32 of the IC card 12 communicate with each other in the same manner.

In addition, the RF transmitter 32 of the IC card 12 has the same configuration as the RF transmitter 21 of the reader/writer 11. The RF receiver 22 of the reader/writer 11 also has the same configuration as the RF receiver 31 of the IC card 12. Thus, a detailed explanation is given below only on the data transmission/reception operations between the RF transmitter 21 of the reader/writer 11 and the RF receiver 31 of the IC card 12. An explanation of the data transmission/reception operations between the RF transmitter 32 of the IC card 12 and the RF receiver 22 of the reader/writer 11 is omitted.

Now, referring to FIGS. 2A and 2B, the line-to-line coupling of the microstrip lines will be described.

In the microstrip line, a conductive strip 53 is formed on a dielectric substrate 52 that is in turn formed on a ground plane 51. High-frequency RF signals (i.e., microwave-band signals) propagate along the conductive strip 53. These RF signals correspond to data to be transmitted or received.

The ground plane 51 and the conductive strip 53 are composed of conductors such as gold and copper. The dielectric substrate 52 is composed of glass epoxy (e.g., RF4).

Figure 2A:
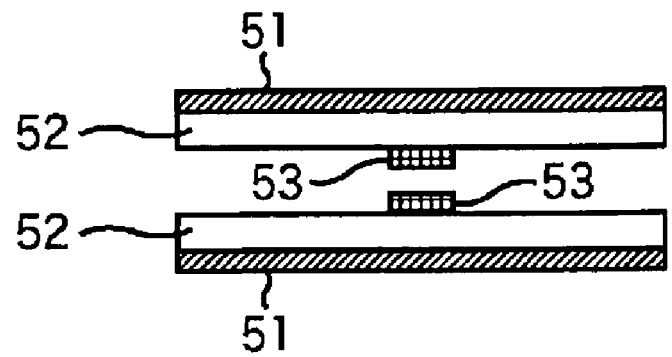
FIGS. 2A and 2B illustrate line-to-line coupling of microstrip lines.
Figure 2B:
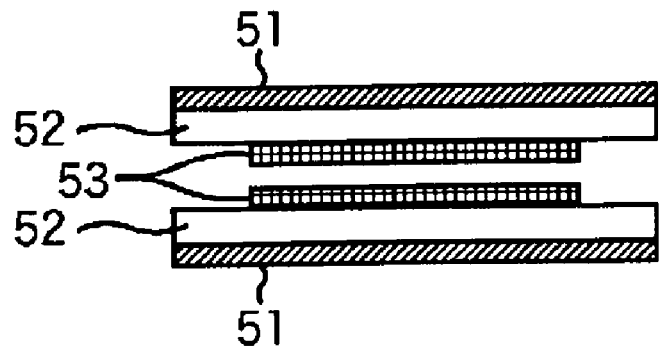

As shown in FIGS. 2A and 2B, the conductive strip 53 in a transmitting side (e.g., the lower side in the figures) and the conductive strip 53 in a receiving side (e.g., the upper side in the figures) are brought closer, facing each other. As a result, the line-to-line coupling of the microstrip lines is achieved. FIG. 2A is a cross section of the microstrip lines. More specifically, in FIG. 2A, the microstrip lines are viewed from the direction that the RF signal propagates along the conductive strip 53. FIG. 2B is a longitudinal section of the microstrip lines. More specifically, in FIG. 2B, the microstrip lines are viewed from a direction horizontal and perpendicular to the propagation direction of the RF signal.

As shown in FIGS. 2A and 2B, the conductive strips 53 in the transmitting and receiving sides are brought closer, facing each other. The RF signal then propagates along the conductive strip 53 in the transmitting side. This causes the line-to-line coupling between the conductive strips 53 on both sides. At this time, the microstrip lines serve as a directional coupler.

Figure 3:
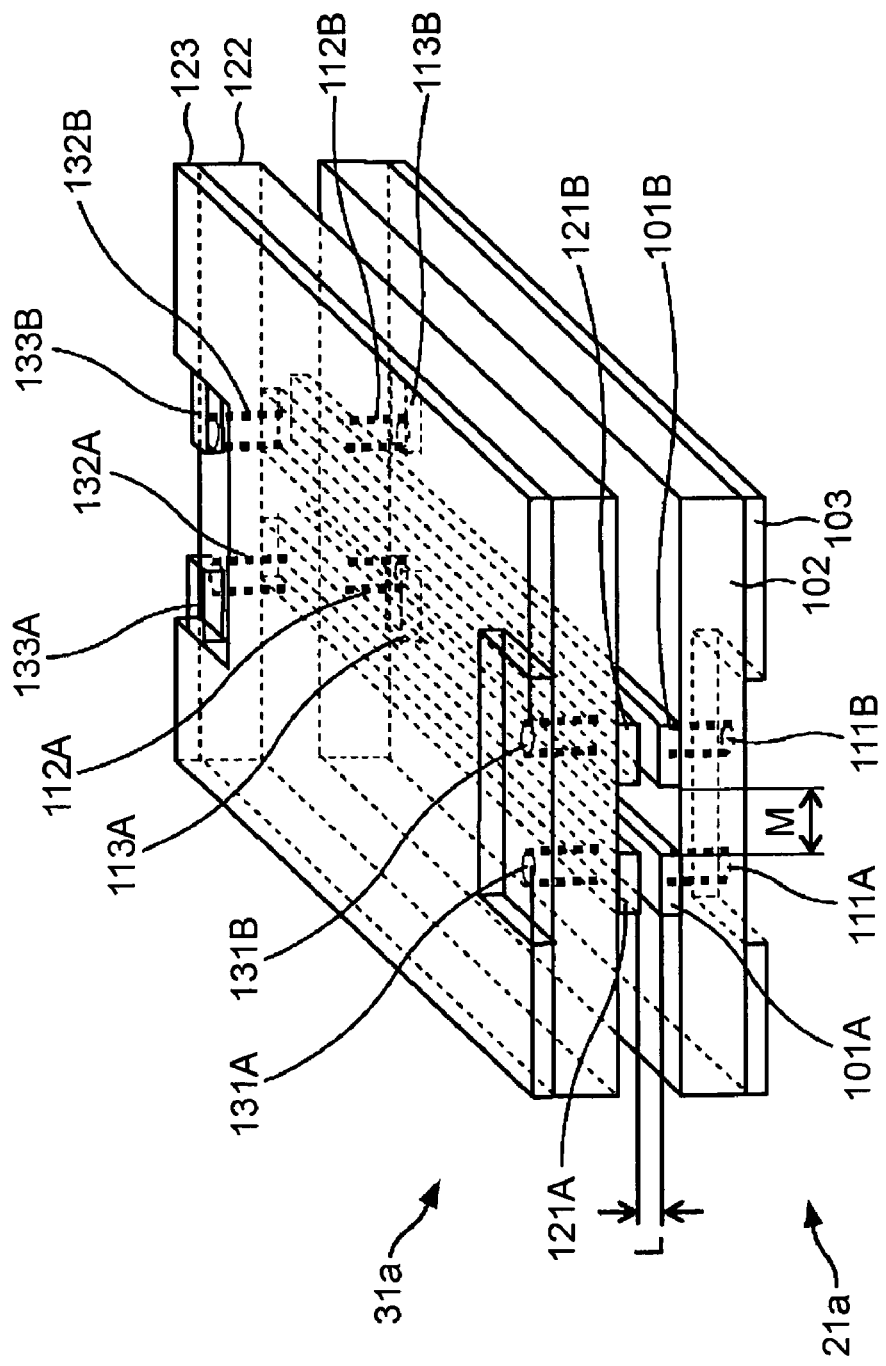
FIG. 3 is a perspective view illustrating an example of detailed configurations of communication surfaces.

FIG. 3 is a perspective view illustrating detailed configurations of the communication surface 21a of the RF transmitter 21 and the communication surface 31a of the RF receiver 31.

The communication surface 21a of the reader/writer 11 has, from the side closer to the facing communication surface 31a of IC card 12, conductive strips (hereinafter, simply referred to as "strips") 101A and 101B, a dielectric substrate 102, and a ground plane 103. The strips 101A and 101B are disposed in parallel on the dielectric substrate 102 separated from each other by a predetermined gap M (for example, a few mm).

A port 111A is coupled to one end of the strip 101A. The port 111A supplies the strip 101A with the RF signal fed from a transmitting circuit (not shown). The transmitting circuit is disposed facing the strip 101A across the ground plane 103 (i.e., on the lower side in the figure). A port 112A is coupled to the other end of the strip 101A, i.e., the opposite end of where the port 111A is coupled. The port 112A is also coupled to the ground plane 103 through a resistor (i.e., a terminating resistor) 113A.

Likewise, a port 111B is coupled to one end of the strip 101B. The port 111B supplies the strip 101B with the RF signal fed from a transmitting circuit (not shown) facing the strip 101B across the ground plane 103. A port 112B is coupled to the other end of the strip 101B, i.e., the opposite end of where the port 111B is coupled. The port 112B is also coupled to the ground plane 103 through a resistor (i.e., a terminating resistor) 113B.

In addition, the strips 101A and 101B (also, strips 121A and 121B described below) are separated from each other by the gap M that can avoid crosstalk problems.

The communication surface 31a of the IC card 12 has the same configuration as the communication surface 21a of the reader/writer 11.

More specifically, the communication surface 31a of the IC card 12 has, from the side closer to the facing communication surface 21a of the reader/writer 11, conductive strips (hereinafter, simply referred to as "strips") 121A and 121B, a dielectric substrate 122, and a ground plane 123. The strips 121A and 121B are disposed in parallel on the dielectric substrate 122 separated from each other by the predetermined gap M (for example, a few mm).

A port 131A is coupled to one end of the strip 121A. The port 131A supplies a receiving circuit (not shown) with the RF signal received via the line-to-line coupling. The receiving circuit is disposed facing the strip 121A across the ground plane 123 (i.e., on the upper side in the figure). A port 132A is coupled to the other end of the strip 121A, i.e., the opposite end of where the port 131A is coupled. The port 132A is also coupled to the ground plane 123 through a resistor (i.e., a terminating resistor) 133A.

Likewise, a port 131B is coupled to one end of the strip 121B. The port 131B supplies a receiving circuit (not shown) facing the strip 121B across the ground plane 123 with the RF signal received via the line-to-line coupling. A port 132B is coupled to the other end of the strip 121B, i.e., the opposite end of where the port 131B is coupled. The port 132B is also coupled to the ground plane 123 through a resistor (i.e., a terminating resistor) 133B.

As shown in FIG. 3, the strips 101A and 101B of the RF transmitter 21 and the strips 121A and 121B of the RF receiver 31, respectively, are brought close enough to form a gap L (for example, a few mm). Accordingly, the RF transmitter 21 and the RF receiver 31 perform the data transmission/reception operations.

Figure 4:
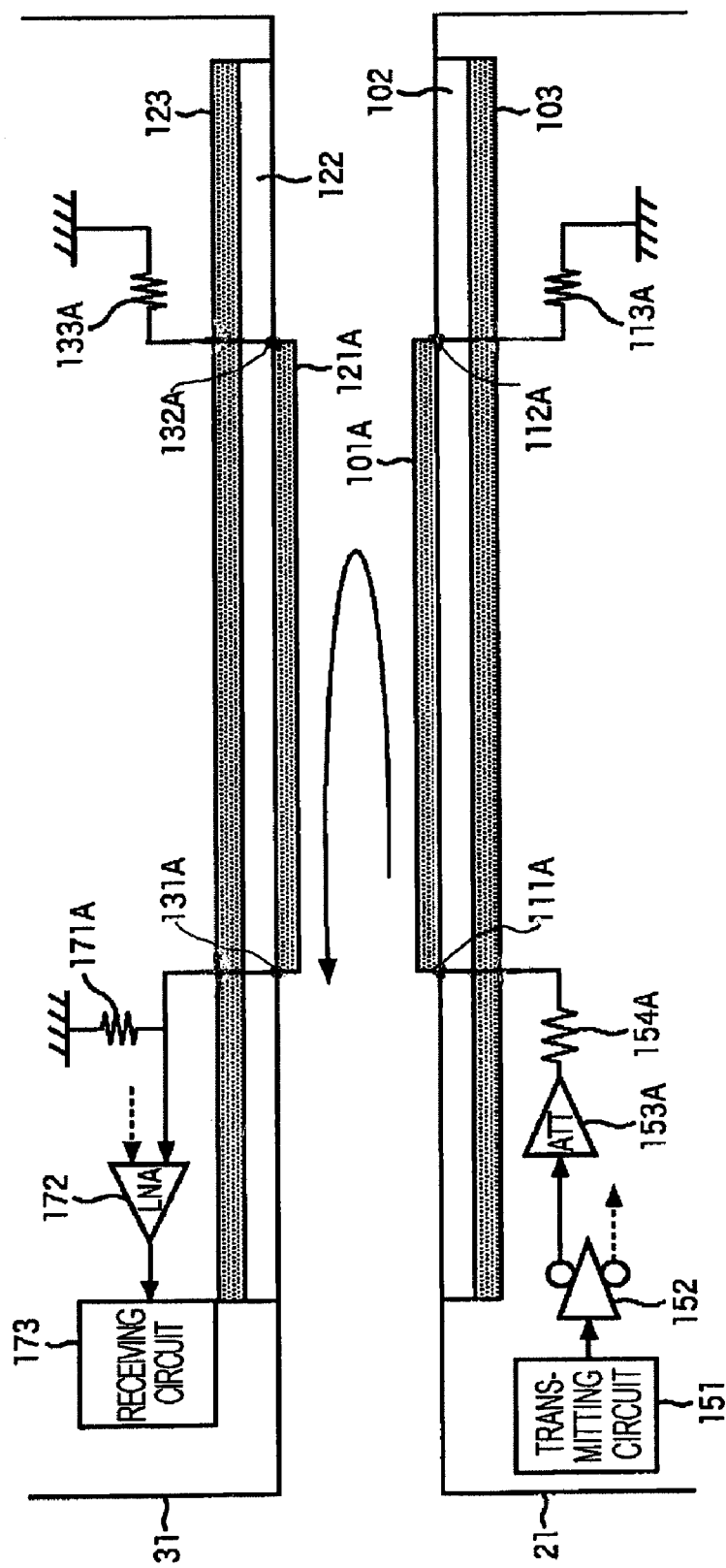
FIG. 4 illustrates an outline of a data transmission/reception operation.

Now, referring to FIG. 4, an outline of the data transmission/reception operation between the RF transmitter 21 of the reader/writer 11 and the RF receiver 31 of the IC card 12 is described. In FIG. 4, the same reference numerals as those shown in FIG. 3 have been used to indicate corresponding parts. In addition, for ease of understanding, FIG. 4 shows one of two strips disposed on the communication surface 21a or 31a. More specifically, FIG. 4 omits the strip 101B out of the strips 101A and 101B disposed in the RF transmitter 21. Likewise, FIG. 4 omits the strip 121B out of the strips 121A and 121B disposed in the RF receiver 31.

A transmitting circuit 151 of the RF transmitter 21 supplies a differential driver 152 with a high-frequency RF signal corresponding to data to be transmitted. The differential driver 152 generates differential signals from the supplied RF signal. The differential driver 152 supplies one of the differential signals to an attenuator 153A disposed prior to the strip 101A. The differential driver 152 also supplies the other differential signal, indicated by a broken line in the figure, to an attenuator (corresponding to an attenuator 153B shown in FIG. 5) disposed prior to the strip 101B.

The attenuator 153A amplifies or attenuates the supplied RF signal to adjust the RF signal to an optimum level. The RF signal from the attenuator 153A is fed to the strip 101A through a resistor 154A and the port 111A. The resistors 154A and 113A suppress the reflection of the RF signal.

Propagation of the RF signal along the strip 101A causes the line-to-line coupling between the strip 101A of the RF transmitter 21 and the strip 121A of the RF receiver 31 which are sufficiently close to form a gap L enabling the data transmission/reception operation. The strip 121A receives the RF signal via the line-to-line coupling.

The RF signal received by the strip 121A is fed to an LNA (Low-Noise Amplifier) 172 through the port 131A. As in the case of the above-mentioned resistors 154A and 113A, resistors 171A and 133A suppress the reflection of the RF signal.

The LNA 172 receives the RF signal (indicated by a broken line in the figure) received by the strip 121B as well as that received by the strip 121A. The RF signals received by the strips 121A and 121B have opposite phases.

The LNA 172 converts two RF signals, having phases shifted by 180 degrees, into a single-ended RF signal. The LNA 172 then supplies the single-ended RF signal to a receiving circuit 173. The receiving circuit 173 converts the RF signal supplied from the LNA 172 into data, and stores the data.

Figure 5:
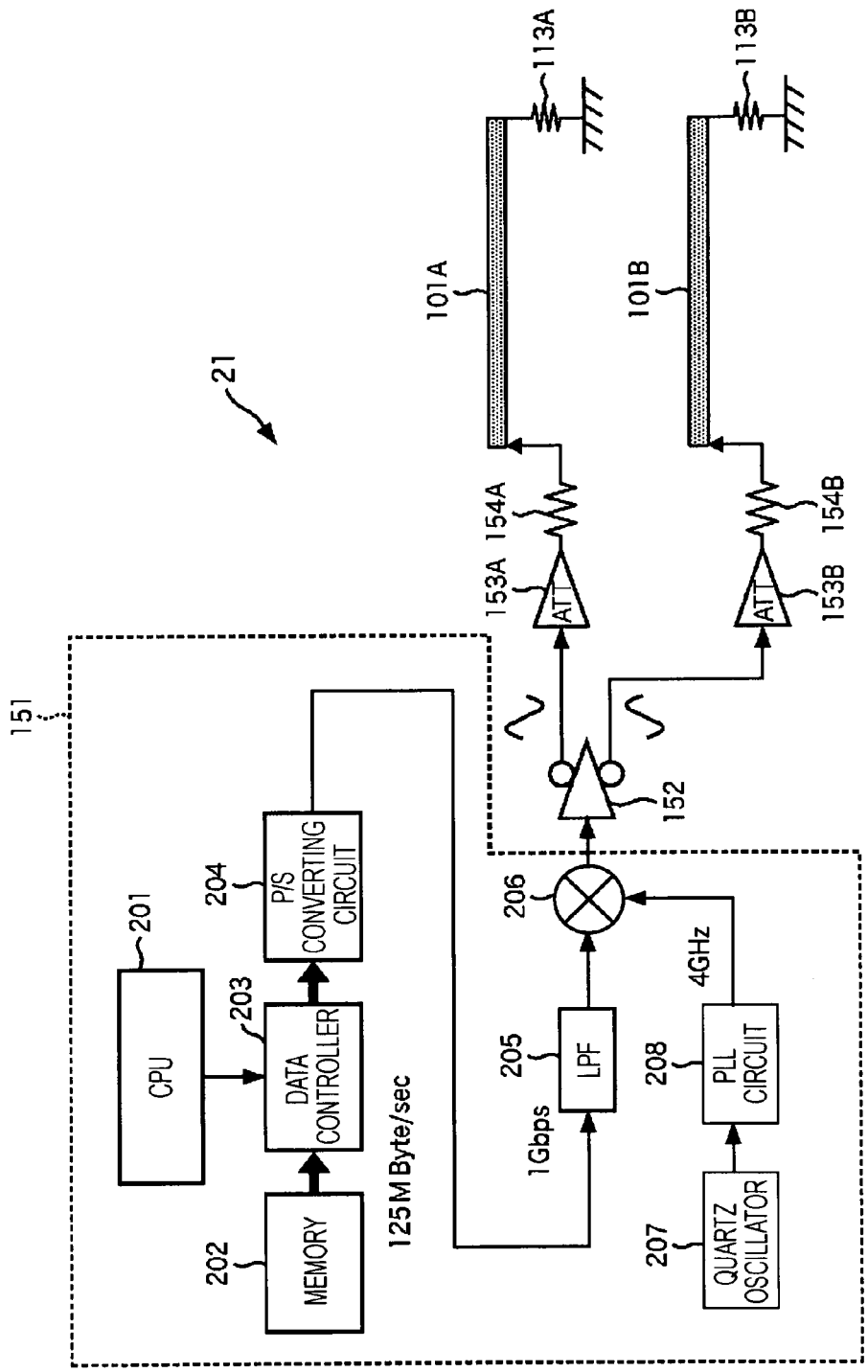
FIG. 5 illustrates an example of a configuration of an RF transmitter.

FIG. 5 illustrates an example of a configuration of the RF transmitter 21 including a detailed configuration of the transmitting circuit 151.

A CPU (Central Processing Unit) 201 instructs a data controller 203 to transmit data. On the basis of the instruction given by the CPU 201, the data controller 203 reads out predetermined data to be transmitted from a memory 202 at a speed of, for example, 125 megabytes per second (M Byte/sec). The data controller 203 then supplies a P/S (Parallel to Serial) converting circuit 204 with the read-out data.

The P/S converting circuit 204 converts the parallel data to be transmitted into serial data, and supplies the serial data to a LPF (Low-Pass Filter) 205. As mentioned above, since the P/S converting circuit 204 receives the data at the speed of 125 M Byte/sec, the serial data is supplied at the speed of 1 gigabit per second (Gbps).

The LPF 205 removes high-frequency components included in the data to be transmitted supplied from the P/S converting circuit 204, and supplies a mixer 206 with the data. The mixer 206 multiplies the signal supplied from the LPF 205 and a signal supplied from a PLL (Phase-Locked Loop) circuit 208. Accordingly, BPSK (Binary Phase Shift Keying) modulation is performed on the data supplied from the LPF 205.

A quartz oscillator 207 generates a signal having a predetermined frequency (i.e., oscillation frequency), and supplies the signal to the PLL circuit 208. On the basis of the signal, having the oscillation frequency, supplied from the quartz oscillator 207, the PLL circuit 208 supplies a 4 GHz signal, i.e., a carrier wave, to the mixer 206.

The RF signal, corresponding to the data to be transmitted, having undergone the BPSK modulation by the mixer 206 is then supplied to the differential driver 152. The differential driver 152 generates differential signals from the supplied RF signal corresponding to the data to be transmitted. The differential driver 152 supplies one of the differential signals to the attenuator 153A disposed prior to the strip 101A and the other differential signal to the attenuator 153B disposed prior to the strip 101B.

After having undergone a level adjustment performed by the attenuators 153A and 153B, the RF signals, supplied to the strips 101A and 101B through the resistors 154A and 154B, propagate along the strips 101A and 101B, respectively.

In the RF transmitter 21 having the above-described configuration, the differential signals corresponding to the data read out from the memory 202 propagate along the strips 101A and 101B.

Figure 6:
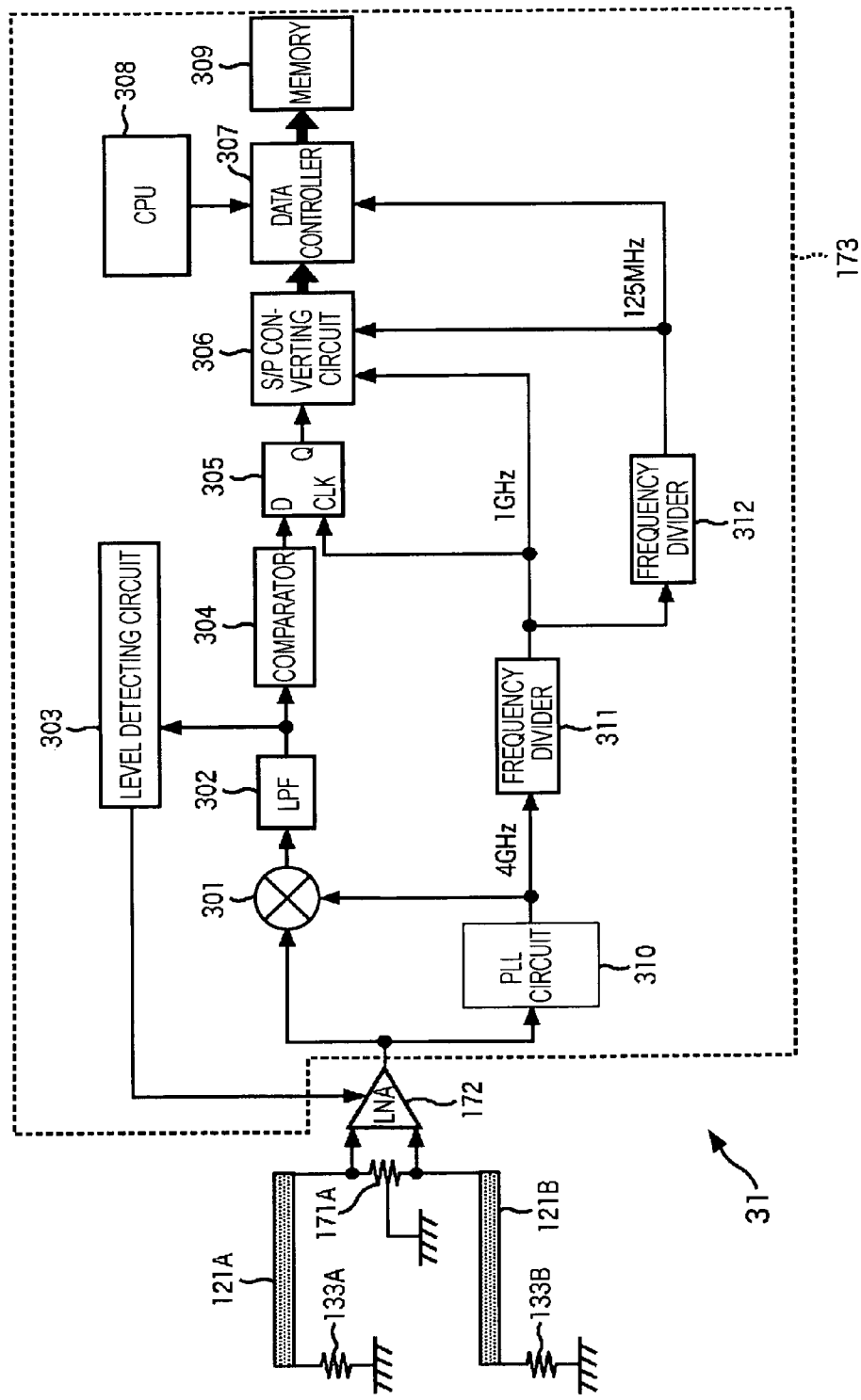
FIG. 6 illustrates an example of a configuration of an RF receiver.

FIG. 6 illustrates an example of a configuration of the RF receiver 31 including a detailed configuration of the receiving circuit 173.

The RF signals received by the strips 121A and 121B via the line-to-line couplings are fed to the LNA 172. The phases of these RF signals are opposite to each other.

The LNA 172 converts the RF differential signals, having opposite phases, supplied from the strips 121A and 121B into the single-ended signal. The LNA 172 supplies a mixer 301 and a PLL circuit 310 included in the receiving circuit 173 with the single-ended signal. The converted single-ended signal is the signal corresponding to the received data, which is transmitted from the RF transmitter 21.

The LNA 172 also adjusts (amplifies or attenuates) the level of the RF signal to be supplied to the mixer 301 and the PLL circuit 310 on the basis of a detection signal fed from a level detecting circuit 303. That is, the LNA has an AGC (Auto Gain Control) function for adjusting the RF signal.

The mixer 301 multiplies the RF signal, corresponding to the received data, supplied from the LNA 172 and a signal supplied from the PLL circuit 310. Accordingly, BPSK demodulation is performed on the RF signal corresponding to the received data. The mixer 310 supplies a LPF 302 with the demodulated RF signal. The LPF 302 removes high-frequency components included in the demodulated RF signal, and supplies the RF signal to the level detecting circuit 303 and a comparator 304.

The level detecting circuit 303 detects the level of the RF signal supplied from the LPF 302, and notifies the LNA 172 of the detection result. The comparator 304 determines whether the level of the RF signal supplied from the LPF 302 is higher or lower than a predetermined level, i.e., compares the level of the RF signal with the predetermined level. On the basis of the comparison, the comparator 304 performs wave-shaping on the RF signal. The comparator 304 supplies the wave-shaped digital signal corresponding to the received data to a DFF (Delayed Flip-Flop) 305. More specifically, when the level of the RF signal is higher than the predetermined level, the HIGH level signal is supplied to the DFF 305. In contrast, when the level of the RF signal is lower than the predetermined level, the LOW-level signal is supplied.

The DFF 305 supplies an S/P (Serial to Parallel) converting circuit 306 with the digital signal (D) supplied from the comparator 304 at the time of a rise (or a fall) of a 1 GHz clock signal (CLK) supplied from a frequency divider 311.

The S/P converting circuit 306 converts the serial digital signal, corresponding to the received data, supplied from the DFF 305 into a parallel digital signal. The S/P converting circuit 306 then supplies the parallel digital signal to a data controller 307. At this time, the S/P converting circuit 306 reads the received data supplied from the DFF 305 in registers on the basis of the 1 GHz clock signal supplied from the frequency divider 311. Then, the S/P converting circuit 306 supplies the data controller 307 with the parallel data on the basis of a 125 MHz clock signal supplied from a frequency divider 312. Thus, the S/P converting circuit 306 supplies the received data at a speed of 125 M Byte/sec.

According to an instruction given by a CPU 308, the data controller 307 writes (or stores) the received data supplied from the S/P converting circuit 306 in a memory 309. At this time, the data controller 307 writes the received data in the memory 309 on the basis of the 125 MHz clock signal supplied from the frequency divider 312.

A CPU 308 instructs the data controller 307 to receive the data. The memory 309 stores the received data supplied from the data controller 307.

The PLL circuit 310 generates a 4 GHz clock signal, i.e., a carrier wave, on the basis of the RF signal supplied from the LNA 172, and supplies the clock signal to the mixer 301 and the frequency divider 311. The frequency divider 311 divides the frequency (i.e., 4 GHz) of the clock signal supplied from the PLL circuit 310 by 4. The frequency divider 311 then supplies the resulting 1 GHz clock signal to the DFF 305, the S/P converting circuit 306, and the frequency divider 312. The frequency divider 312 divides the frequency (i.e., 1 GHz) of the clock signal supplied from the frequency divider 311 by 8. The frequency divider 312 then supplies the resulting 125 MHz clock signal to the S/P converting circuit 306 and the data controller 307.

The RF receiver 31, having the above-described configuration, demodulates the received data from the differential signals received via the line-to-line couplings, and stores the received data in the memory 309.

Figure 7:
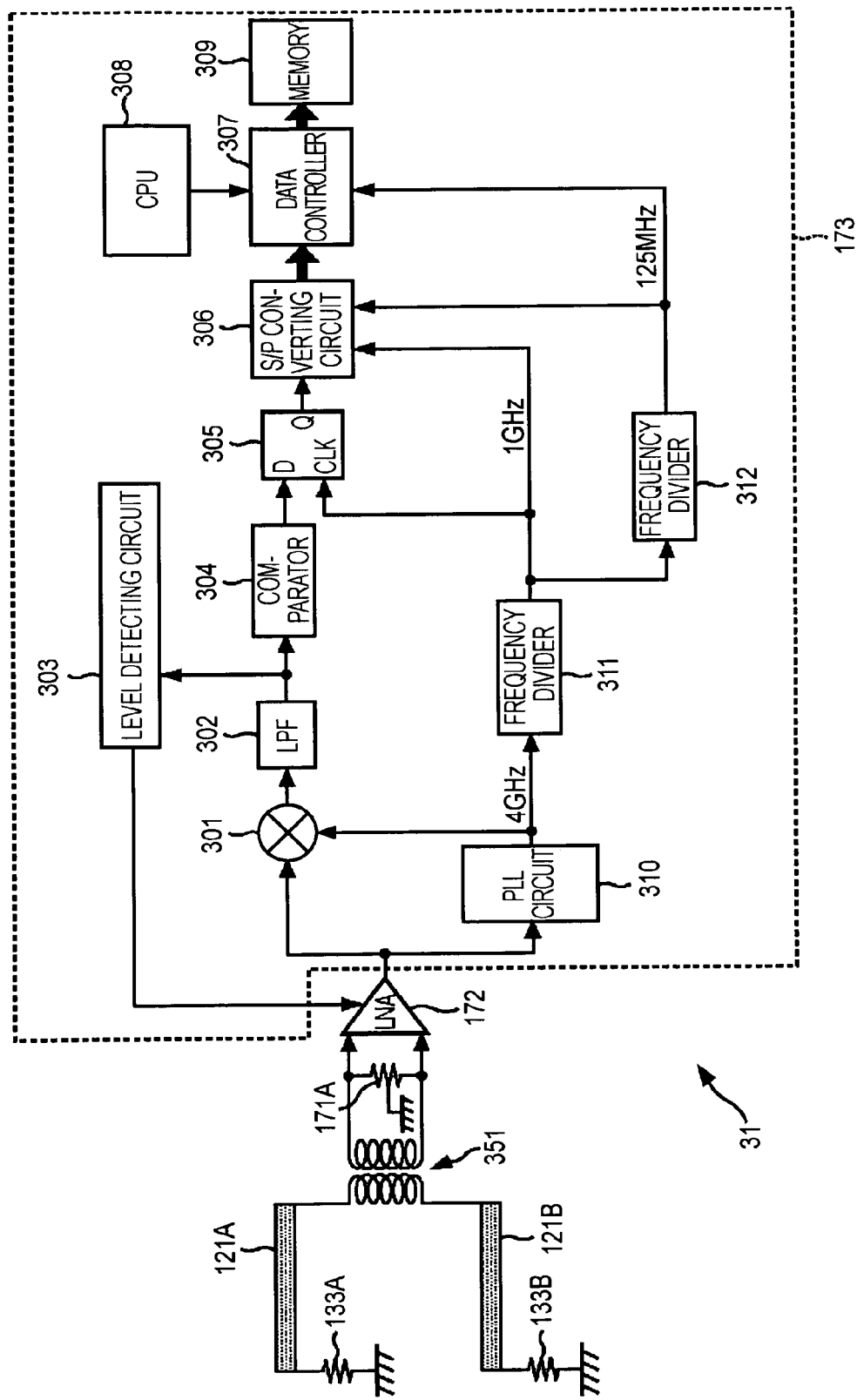
FIG. 7 shows another example of a configuration of an RF receiver.

As shown in FIG. 7, a desired impedance of the microstrip line can be obtained by placing coils 351 between the strips 121A and 121B and the LNA 172.

Now, referring to a flowchart of the FIG. 8, the data transmission/reception operation between the RF transmitter 21 of the reader/writer 11 and the RF receiver 31 of the IC card 12 is described. The RF transmitter 21 and the RF receiver 31 have the above-described configurations. In FIG. 8, it is assumed that the reader/writer 11 and the IC card 12 are brought close enough to form a gap L that enables the data transmission/reception operation.

First, at STEP S11, the data controller 203 reads out the predetermined data (i.e., the data to be transmitted) stored in the memory 202 at the speed of, for example, 125 M Byte/sec. The data controller 203 supplies the P/S converting circuit 204 with the read-out data.

At STEP S12, the P/S converting circuit 204 converts the parallel data to be transmitted into the serial data, and supplies the serial data to the LPF 205.

At STEP S13, the mixer 206 multiplies the signal supplied from the LPF 205 and the signal supplied from the PLL circuit 208, thereby performing the BPSK modulation on the data to be transmitted supplied from the LPF 205.

At STEP S14, the differential driver 152 generates the differential signals from the supplied RF signal corresponding to the data to be transmitted. The differential driver 152 supplies the one of the differential signals to the attenuator 153A disposed prior to the strip 101A and the other differential signal to the attenuator 153B disposed prior to the strip 101B.

At STEP S15, the differential signals supplied from the attenuators 153A and 153B propagate along the strips 101A and 101B, respectively.

At STEP S16, the differential signals are transmitted from the strips 101A and 101B of the reader/writer 11 to the strips 121A and 121B of the IC card 12 via the line-to-line couplings caused therebetween, respectively.

At STEP S17, the LNA 172 converts the RF differential signals, corresponding to the received data, supplied from the strips 121A and 121B into the single-ended signal. The LNA 172 then supplies the single-ended signal to the mixer 301 and the PLL circuit 310 included in the receiving circuit 173. In addition, at STEP S17, the PLL circuit 310 generates the 4 GHz clock signal, i.e., the carrier wave, on the basis of the RF signal supplied from the LNA 172. The PLL circuit 310 then supplies the clock signal to the mixer 301 and the frequency divider 311.

At STEP S18, the mixer 301 multiplies the RF signal, corresponding to the received data, supplied from the LNA 172 and the signal supplied from the PLL circuit 310, thereby performing the BPSK demodulation on the RF signal corresponding to the received data.

In addition, at STEP S18, the frequency divider 311 divides the frequency of the clock signal supplied from the PLL circuit 310 by 4. The frequency divider 311 then supplies the DFF 305, the S/P converting circuit 306, and the frequency divider 312 with the resulting 1 GHz clock signal. The frequency divider 312 divides the frequency of the clock signal supplied from the frequency divider 311 by 8. The frequency divider 312 then supplies the S/P converting circuit 306 and the data controller 307 with the resulting 125 MHz clock signal.

At STEP S19, the S/P converting circuit 306 converts the received serial data, supplied from the DFF 305, into the parallel data. The S/P converting circuit 306 supplies the parallel data to the data controller 307.

At STEP S20, the data controller 307 writes the received data supplied from the S/P converting circuit 306 in the memory 309, and the process end.

As described above, the RF transmitter 21 and the RF receiver 31 can contactlessly transmit and receive the data at a high transfer rate of 1 Gbps. The RF transmitter 21 and the RF receiver 31 do not include electric contact points. This eliminates the possibility of inaccurate signal transmission/reception due to corrosion of the electric contacts points.

Furthermore, as shown in FIG. 3, utilization of the line-to-line coupling of the microstrip lines enables the transmission of the signals (data) with a simple structure, thereby keeping manufacturing cost at a low level.

Moreover, the strips 101A and 101B are disposed in parallel and are separated from each other by the predetermined gap M. The differential signals having opposite phases propagate along the strips 101A and 101B. Accordingly, it is possible to cancel the distant field, thereby keeping the radiated power regarding the data transmission/reception operation carried out by the RF transmitter 21 and the RF receiver 31 at or lower than a level determined in the Radio Law or the like.

Figure 9:
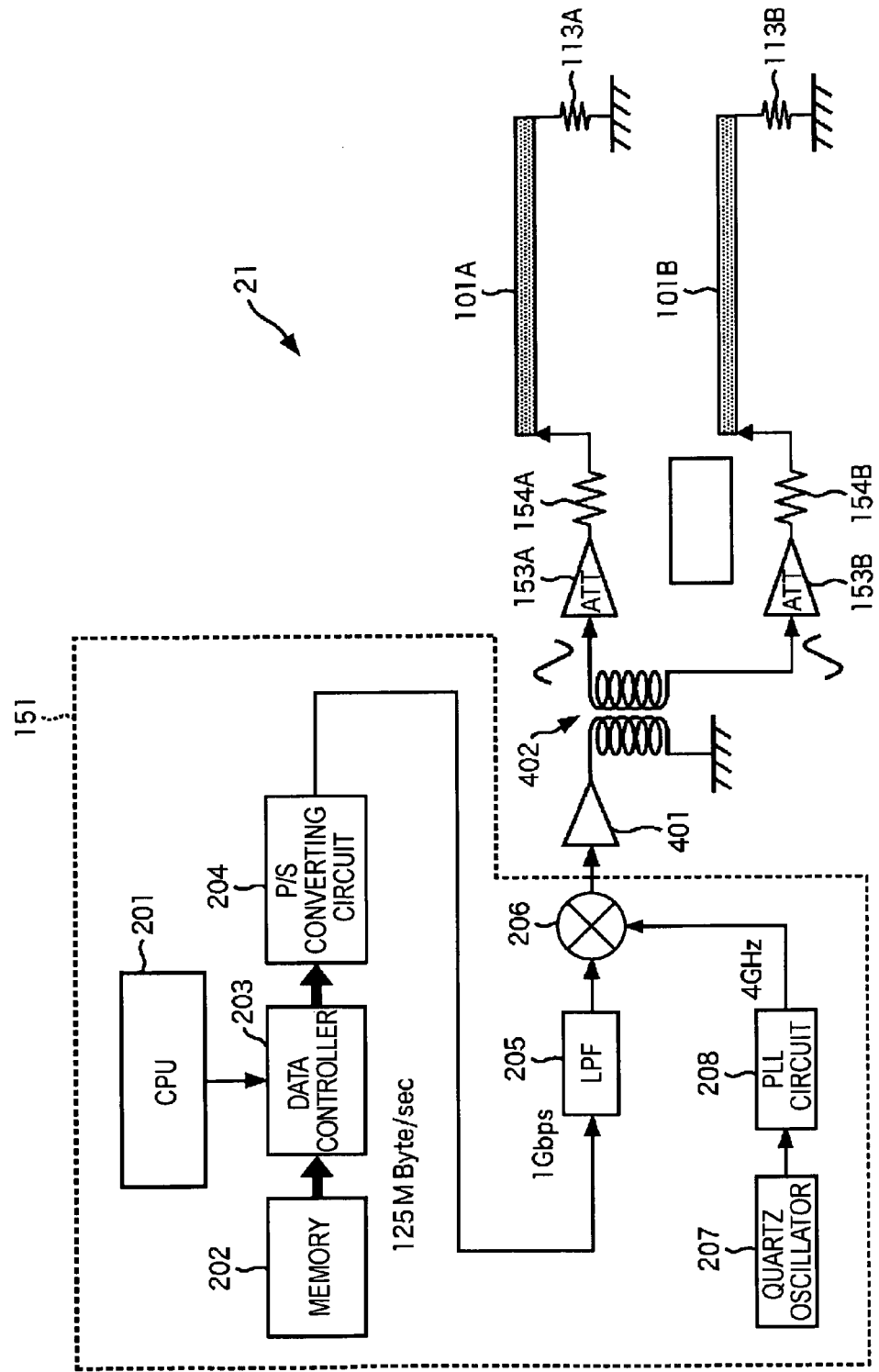
FIG. 9 illustrates another example of a configuration of an RF transmitter.

FIG. 9 shows another example of a configuration of the RF transmitter 21 of the reader/writer 11. The same reference numerals as those shown in FIG. 5 have been used to indicate corresponding parts, thus the explanation for those is omitted.

More specifically, the RF transmitter 21 shown in FIG. 9 has the same configuration as that shown in FIG. 5 except for a driver 401 and coils 402. The driver 401 and the coils 402 are provided instead of the differential driver 152 shown in FIG. 5.

According to the embodiment shown in FIG. 5, the transmitting circuit 151 is coupled to the differential driver 152 that generates the differential signals. However, in an embodiment shown in FIG. 9, the transmitting circuit 151 is coupled to the driver 401 that supplies a single-ended signal. In this case, differential signals are generated from the output signal of the driver 401.

More specifically, in FIG. 9, the transmitting circuit 151 supplies the signal to the driver 401. The driver 401, in turn, supplies the single-ended signal corresponding to the data to be transmitted. In the subsequent stage, the driver 401 is coupled to the coils 402. The coils 402 generate differential signals from the signal supplied by the driver 401. The coils 402 then supply one of the differential signals to the attenuator 153A and the other differential signal to the attenuator 153B.

Figure 10A:
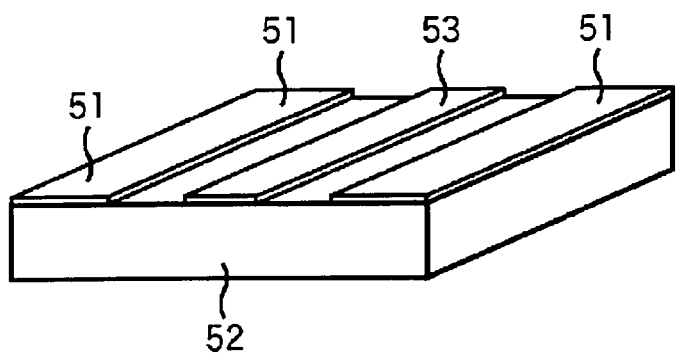
FIGS. 10A, 10B, and 10C illustrate other transmission lines applicable to embodiments of the present invention.
Figure 10B:
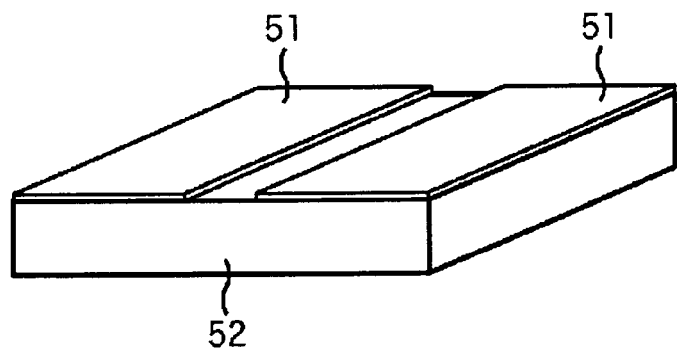
Figure 10C:
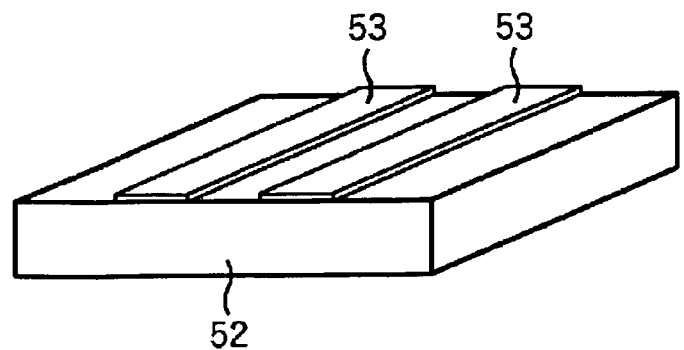

In the embodiments described above, the data transmission/reception operations via the line-to-line coupling have been described. The line-to-line coupling is achieved by facing the two parallel strips disposed in the transmitting side and the receiving side. However, the transmission lines applicable to the present invention are not limited to the microstrip lines. Other transmission lines such as a coplanar waveguide shown in FIG. 10A, a slot line shown in FIG. 10B, and a coplanar stripline shown in FIG. 10C are also applicable to the present invention.

In addition, in the above-described embodiments, the IC card 12 is used as an example of devices capable of contactlessly transmitting and receiving data. However, the present invention can be applied to portable devices other than the IC card, such as, for example, mobile phones, PDAs (Personal Digital Assistants), digital cameras, and digital audio players having flash memories or hard disk drives.

Furthermore, in this specification, the steps shown in the flowchart may be included in a process that is executed sequentially in the described order, and in a process that is executed in parallel or individually, not necessarily sequentially.

Moreover, in this specification, the term "system" indicates the whole equipment including a plurality of devices.

It should be understood that the present invention is not limited to the embodiments described above, and various modifications can be made without departing from the sprit and scope of the present invention.

What is claimed is:

1. A communication system comprising:
   a transmitting device, configured to transmit data, including
      first and second transmission lines, disposed in parallel at a predetermined gap, configured to propagate a microwave signal, and
      a differential signal outputter configured to generate differential signals having opposite phases from the microwave signal corresponding to the data, and to output one of the differential signals to the first transmission line and the other differential signal to the second transmission line; and
   a receiving device, configured to receive the data, including
      third and fourth transmission lines, disposed in parallel at the predetermined gap, configured to propagate the microwave signal, and
      a converter configured to convert the differential signals having opposite phases generated at the third and fourth transmission lines by line-to-line couplings into the microwave signal corresponding to the data, and to output the converted microwave signal,
         wherein the differential signals are generated at the third and fourth transmission lines by the line-to-line couplings when the third and fourth transmission lines are brought closer to the first and second transmission lines that are propagating the differential signals so that the third and fourth transmission lines face the first and second transmission lines, respectively; and
      a comparator configured to compare the level of the signal supplied from the converter with a predetermined level, and to perform wave-shaping on the supplied signal.

2. The communication system according to claim 1, further comprising an attenuator configured to adjust the differential signals to a predetermined level.

3. A receiving device configured to receive data from a transmitting device having first and second transmission lines, the receiving device comprising:
   third and fourth transmission lines, disposed in parallel at a predetermined gap, configured to propagate a microwave signal;
   a converter configured to convert differential signals having opposite phases generated at the third and fourth transmission lines by line-to-line couplings into the microwave signal corresponding to the data, and to output the converted microwave signal,
      wherein the differential signals are generated at the third and fourth transmission lines by the line-to-line couplings when the third and fourth transmission lines are brought closer to the first and second transmission lines that are propagating the differential signals generated from the microwave signal corresponding to the data so that the third and fourth transmission lines face the first and second transmission lines, respectively; and a comparator configured to compare the level of the signal supplied from the converter with a predetermined level, and to perform wave-shaping on the supplied signal.

4. The receiving device according to claim 3, wherein the third and fourth transmission lines are microstrip lines.

5. The receiving apparatus according to claim 3, further comprising a level detector configured to detect the level of the signal output from the converter, wherein the converter adjusts the level of the signal corresponding to the data in accordance with the level detected by the level detector, and outputs the signal.

6. A receiving method for a receiving device, configured to receive data from a transmitting device having first and second transmission lines, comprising the steps of:

disposing third and fourth transmission lines in parallel at a predetermined gap to propagate a microwave signal;

converting differential signals having opposite phases generated at the third and fourth transmission lines by line-to-line couplings into the microwave signal corresponding to the data;

comparing the level of the signal supplied from the converter with a predetermined level;

performing wave-shaping on the supplied signal; and outputting the converted microwave signal, wherein the differential signals are generated at the third and fourth transmission lines when the third and fourth transmission lines are brought closer to the first and second transmission lines that are propagating the differential signals generated from the microwave signal corresponding to the data so that the third and fourth transmission lines face the first and second transmission lines, respectively, causing the third transmission line to propagate one of the differential signals and causing the fourth transmission line to propagate the other differential signal; and causing the conversion of the differential signals into the microwave signal corresponding to the data, and outputting the converted microwave signal.

* * * * *